United States Patent Office 3,474,001
Patented Oct. 21, 1969

3,474,001
GROWING MICROORGANISMS ON HYDROCARBONS
Richard I. Leavitt, Pennington, N.J., assignor to Mobil Oil Corporation, a corporation of New York
No Drawing. Filed Mar. 27, 1967, Ser. No. 625,972
Int. Cl. C12b 1/04
U.S. Cl. 195—28                                         10 Claims

ABSTRACT OF THE DISCLOSURE

A method is provided for increasing the growth of microorganisms on volatile hydrocarbons having up to about 8 carbon atoms by adding to the volatile hydrocarbon a monomeric hydrocarbon having more than 8 carbon atoms or a polymeric hydrocarbon. The use of the higher hydrocarbons effectively reduces the vapor pressure of the lower one, thus producing therein an increased growth response.

BACKGROUND OF THE INVENTION

Discussion of the prior art

The growing or culturing of microorganisms using a hydrocarbon as the sole source of carbon is known. To assure rapid growth, the hydrocarbon is introduced in the liquid or vaporous state to a culture comprising the microorganisms and a suitable nutrient such as an aqueous solution of mineral salts. In general, however, microbial growth on lower boiling and gaseous hydrocarbons is slow, and although more and more techniques relating to hydrocarbon substrates as carbon sources in culturing microorganisms are appearing, no process has yet been disclosed which allows easy utilization thereof.

The art describes various attempts to induce rapid growth of microorganisms on hydrocarbon substrates. U.S. Patent 2,697,061 is concerned with a method of increasing growth by selecting and maintaining proper pH and temperature ranges, and by selecting proper nutrient salts. The main disadvantage of the method is the unreasonably long period required to obtain optimum yield.

Another patent, U.S. 3,201,327, concerns a novel means and process for aerating and dispersing fermentation broth during fermentation so as to accelerate the propagation of the microorganisms feeding upon hydrocarbon substrates. This method, however, concerns a mechanical means for increasing such propagation, and requires an apparatus having a specific and fairly elaborate design.

Still another reference is U.S. 3,293,145, which discloses a method for increasing the growth rate of microorganisms on hydrocarbons used as the sole source of carbon by adding to the nutrient solution a small amount of a nonionic surface active agent which acts as a growth stimulator.

Field of the invention

The present invention relates to a method for increasing microbial growth on volatile hydrocarbon substrates. More particularly, it relates to a method for increasing such growth by blending two hydrocarbons, the vapor pressure of one being lower than that of the other, such that the growth of the microorganism on the volatile hydrocarbon is increased.

SUMMARY OF THE INVENTION

In accordance with the invention there is provided a method for increasing the growth of a microorganism on a volatile aliphatic hydrocarbon as the primary source of carbon, which comprises introducing said volatile aliphatic hydrocarbon containing from about 3 to 8 carbon atoms and another hydrocarbon from the group of monomeric hydrocarbons containing in excess of 8 carbon atoms and a polymeric hydrocarbon, into a culture comprising a nutrient and said microorganism, said monomeric hydrocarbon or polymeric hydrocarbon being present in an amount sufficient to reduce the vapor pressure of said volatile aliphatic hydrocarbon to a value which allows increased utilization thereof by said microorganisms.

The products specifically exemplified herein are the microbial cells themselves as well as certain amino acids, polybetahydroxybutyrate, and dicarboxylic acids which are produced during the growth processes of the microorganisms. The microbial cells themselves, which contain a large amount of protein, often of the order of 50% or better, are useful as feeds, as feed supplements, or as fertilizer materials. The compounds produced during growth are old and may be used in known ways.

DESCRIPTION OF SPECIFIC EMBODIMENTS

Increasing the growth rate of microorganisms is of importance in view of the ability of many of them to synthesize useful products such as proteins, amino acids, vitamins, lipids, polymers, and other compounds of value. These products may be found in the cells or secreted by them into the medium in which the microbe is growing, and in either case are recoverable. Their rate of formation increases with the rate of cell growth, and as a result, less time is required before harvesting of the cells can take place. The invention is also of importance to the microbial oxidation of hydrocarbons. Thus, certain hydrocarbons such as n-octane, are not only rendered more capable of being utilized by a microorganism as a carbon source therefor, but also, and during the course of being utilized are converted by the microorganism to various oxygenated hydrocarbon products.

A preferred microorganism is an Achromobacter, as exemplified by species such as *A. xerosis*, *A. qutatus*, *A. superficiatis*, *A. parvulus*, and *A. cycloclastes*. Also useful is the genus Nocardia, particularly *N. salmonicolor*, but also including *N. asteroids*, *N. opaca*, *N. corallina*, and *N. rubra*, as well as the genus Bacillus, including *B. megaterium*, *B. subtilus*, *B. pumilus*, and *B. alvei*.

The said volatile aliphatic hydrocarbon which is the primary source of carbon for the microorganism is a saturated or unsaturated, straight or branched chain hydrocarbon having from about 3 to 8 carbon atoms. These will include n-propane, n-butane, n-pentane, n-heptane, and n-octane as well as the branched chain members thereof. Also included are propene, butene, pentene, hexene, heptene, and octene. The said monomeric hydrocarbons useful in this invention will include hydrocarbons containing at least 9 carbon atoms, such as nonane, decane, dodecane, and tetradecane, as well as other straight and branched chain, saturated and unsaturated monomeric hydrocarbons containing up to about 30 carbon atoms. Polymeric hydrocarbons contemplated include such polymers as polybutene and polydecene. In general, any such monomeric or polymeric hydrocarbon which has a low volatility, is relatively inert (will not by itself adequately support microbial growth), and is miscible with the growth substrate, will be useful. The amount of hydrocarbon is that required to provide carbon for growth and energy and may be chosen for any desired growth period, although it may also be added from time to time to a culture mixture as may be necessary. It is desirable to add only the required amount so as to avoid separation problems at the end of the growth period.

The mineral nutrient comprises mineral salts which furnish ions of nitrate or nitrite, potassium, ferrous or ferric, calcium, magnesium, phosphate, and sulfate, as well as ions of trace elements such as zinc, manganese, copper, and molybdenum. Water is included in the nutrient mixture, so most of these mineral salts will usually be present in sufficient quantity when ordinary potable water supplies are used. However, it is desirable to add the salts to the mixture to insure their presence in sufficient quantity for growth. Usually the nutrient mixture consists primarily of water, which may constitute up to 99%, or more, by weight of the liquid phase of the mixture, although it may also constitute a lesser portion, going down to 50% by weight of the liquid phase. Generally, any proportion of water heretofore employed in microbial synthesis may be used.

A suitable mineral salt medium may be listed as follows, the components being dissolved in enough water to make one liter of solution.

| Component: | Grams |
| --- | --- |
| Ammonium sulfate | 1.0 |
| Potassium dihydrogen phosphate | 2.0 |
| Sodium monohydrogen phosphate | 3.0 |
| Magnesium sulfate | 0.2 |
| Calcium chloride | 0.01 |
| Ferrous sulfate | 0.005 |
| Manganese sulfate | 0.002 |
| Sodium carbonate | 0.1 |

In general aspect the method comprises incubating the microorganism in the mineral nutrient, in which the hydrocarbons are present, with stirring, and after growth is obtained, separating the cells from the medium. Recovery of the desired components from the cells or from the supernatant may then be carried out. In some cases fractionation of the cells may not be necessary, as where the entire incubated mixture is used in or as an animal feed or as a fertilizer material.

During incubation, which can be done in conventional reactors, the culture mixture is maintained under conditions to insure optimum growth of the microorganism. The temperature, for example, should be maintained between about 20° and about 55° C., preferably from 20° to 30° C. The pH is maintained near neutrality, namely about 7.0, although it may range between about 3.0 and 9.0. It is desirable to maintain the mixture in a condition of agitation as by shaking or by using propellers, paddles, rockers, or stirrers, or other means ordinarily employed for effecting agitation of a liquid mixture. Suitably, the reactants are open to the atmosphere, and with agitation of the mixture, the surface thereof exposed to the atmosphere is continuously renewed as oxygen is taken up. However, where the hydrocarbon is normally gaseous, the reactors are closed and oxygen may be separately supplied by bubbling it or air through the mixture, or it may be present as the major component in a hydrocarbon vapor-oxygen system supplied to the mixture.

Microbial syntheses contemplated by the present method may be completed in times as short as one or two days. The incubation period may, of course, extend longer, but it is of interest to note that many microbial conversions, including syntheses, have in the past required periods of a week or two, or more, within which to produce appreciable growth.

After termination of the incubation period, the cells are harvested, as by centrifuging and drying. Intracellular products may be recovered conventionally, as by rupturing the cell walls and extracting the products from the resulting debris, and thereafter separating the extract further as desired. Extracellular products are recoverable by conventional methods.

The amount of monomeric or polymeric hydrocarbon which will be sufficient for the purposes of this invention will range from about 0.1%, preferably from about 2%, to amounts in excess of the aliphatic hydrocarbon present. While the quantity of monomeric or polymeric hydrocarbons is not critical, since even small amounts with said volatile aliphatic hydrocarbons will show some improvement, there are optimum levels which give the greatest increase in yields. The higher the number of carbon atoms in the aliphatic member the less of the higher member will be required to attain the advantages of the invention. On the other hand, the aliphatic hydrocarbons having low carbon contents, and corresponding high vapor pressures, will require an amount of monomeric or polymeric hydrocarbon which may exceed, sometimes substantially so, its weight.

No attempt to establish optimum concentrations of monomeric or polymeric hydrocarbons with a large number of aliphatic hydrocarbons has been made, since an obviously prohibitive amount of research would have been required to do so. However, optimum conditions have been found, for example, for octane and tetradecane, and results of work with other similar systems indicate that the same general scheme applicable to octane can be applied to these. The scheme provides an easy method for determining, with a few experiments using one aliphatic and one monomeric or polymeric hydrocarbon, amounts of the latter needed to induce maximum growth of a particular microorganism on the volatile aliphatic hydrocarbon.

The method involves selecting a molar amount of a hydrocarbon such as octane, and adding to it incremental amounts of the desired higher hydrocarbon. The growth increase is determined at each increment. In this way the optimum ratio of the two hydrocarbons can be found. Once this is known, similar growth results can be obtained with other higher hydrocarbons by using the same molar amounts thereof which correspond to the molar weight of the test compounds at the maximum growth point. For purposes of illustration, it was found that 0.0185 mole of octane required approximately 0.00347 mole of tetradecane to increase the growth of a test microorganism from 0.05 mg. of cells per ml. (without any tetradecane) to about 1.65 mg./ml. For the purposes of this invention, it is contemplated that other monomeric and polymeric hydrocarbons, as herein defined, will give comparable increases when used at the optimum concentration determined for the test member.

The specific examples which follow illustrate the increase in growth which has been discussed hereinbefore. It is to be understood that they are illustrative only, and are intended in no way to limit the scope of the invention.

Example 1

The hydrocarbon mixtures used in this example were prepared as follows:

Six samples, each containing 3 ml. of n-octane, were prepared as shown in the table below.

| Sample: | Moles Octane | Moles Tetradecane | Vapor Pressure Octane |
| --- | --- | --- | --- |
| 1 | 0.0185 | 0 | 18.48 |
| 2 | 0.0185 | 0.00038 | 18.10 |
| 3 | 0.0185 | 0.00116 | 17.39 |
| 4 | 0.0185 | 0.00193 | 16.73 |
| 5 | 0.0185 | 0.00270 | 16.12 |
| 6 | 0.0185 | 0.00347 | 15.56 |

A soil-isolated organism identified as a member of the genus Achromobacter was inoculated into seven 125 ml. Erlenmeyer flasks containing 50 ml. of the mineral salts nutrient referred to above. In one flask was placed 0.3 ml. of the above sample containing no tetradecane. In a second was placed 0.3 ml. of the mixture containing 0.00038 mole of tetradecane, etc. In the seventh was placed a small amount (0.3 ml.) of tetradecane. The cultures, at a pH of 7.2, were shaken at 30° C. for 48 hours, and the growth was determined by the optical density method. That is, the optical density was measured by testing samples of each culture mixture for the adsorption of visible light rays of a wave length of 400 millimicrons (0.4 micron) in a Bausch and Lomb colorimeter. The resulting data are expressed below as optical density, and the relation between optical density and cell growth is approximately 1.0 g./l. of cells, dry weight, for every optical density of 4.0.

| Sample: | Optical density |
|---|---|
| 1 | 0.44 |
| 2 | 0.72 |
| 3 | 1.80 |
| 4 | 2.46 |
| 5 | 5.00 |
| 6 | 14.00 |
| 7 | 0 |

The octane-tetradecane grown cells were dried and extracted with methanol-chloroform. A polymer was isolated from this extract which was identified as poly-betahydroxybutyrate in accordance with its infrared spectrum.

Example 2

Samples of n-octane were prepared as in Example 1, using the same incremental quantities of polybutene with a molecular weight of 625. Cells of the genus Achromobacter were grown as shown in Example 1. The effect on the growth and utilization of n-octane was essentially the same as observed for Example 1, as shown in the following table.

| | Moles Octane | Moles Polybutene | Vapor Pressure Octane | Optical Density |
|---|---|---|---|---|
| Sample: | | | | |
| 1 | 0.0185 | 0 | 18.48 | 0.21 |
| 2 | 0.0185 | 0.00038 | 18.10 | 0.28 |
| 3 | 0.0185 | 0.00116 | 17.39 | 0.36 |
| 4 | 0.0185 | 0.00193 | 16.73 | 1.04 |
| 5 | 0.0185 | 0.00270 | 16.12 | 3.70 |
| 6 | 0.0185 | 0.00347 | 15.56 | 6.60 |

No growth was observed on polybutene alone.

The spent media of the octane-polybutene grown cells was examined for its amino acid content. The amount of L-tryptophan and the total amount of amino acids were determined. It was found that the media contained 27 mg./l. of L-tryptophan and a total amino acid content of 140 mg./l.

Example 3

In this example, the experimental procedure was essentially the same as in Example 1, and the same organism (Achromobacter) was used. However, the hydrocarbon mixture was a mixture of n-octane and polydecene, molecular weight 650. The growth response was similar to that noted in the above examples, as shown below.

| | Moles Octane | Moles Polydecene | Vapor Pressure Octane | Optical Density |
|---|---|---|---|---|
| Sample: | | | | |
| 1 | 0.0185 | 0 | 18.48 | 0.21 |
| 2 | 0.0185 | 0.0013 | 17.41 | 0.56 |
| 3 | 0.0185 | 0.0025 | 16.43 | 7.60 |
| 4 | 0 | 0.0030 | | .37 |

Example 4

A mixture of n-octane and polybutene 625 was used in this example, employing the same procedure as in the above examples for preparing the samples and for growing the microorganism. The microorganism used was a member of the genus Nocardia. The increase in growth response is shown by the results tabulated below.

| | Moles Octane | Moles Polybutene | Vapor Pressure Octane | Optical Density |
|---|---|---|---|---|
| Sample: | | | | |
| 1 | 0.0185 | 0 | 18.48 | 0.23 |
| 2 | 0 | .00385 | 0 | 0.37 |
| 3 | 0.0185 | .00336 | 15.70 | 9.60 |

Three acids were isolated from the culture fluid of this organism grown on the hydrocarbon mixture. One of the acids was identified as suberic acid by vapor phase chromatography.

Example 5

In this example, an organism identified as *Nocardia salmonicolor* was inoculated into a 125 ml. Erlemeyer flask containing 50 ml. of nutrient solution. A 10% mixture (volume to volume) of butane-air and 0.3 ml. of polybutene 625 were placed in the flask and the microorganism was grown as in Example 1. Two other samples, containing only butane-air and only polybutene, were treated at the same time. There was no growth on polybutene alone. The sample grown on butane alone contained 35 mg. of cells per 50 ml. of medium. The one containing butane and polybutene showed 165 mg. of cells per 50 ml. of medium.

Example 6

An organism of the genus Bacillus was grown (1) on n-octane, (2) on n-tetradecane, and (3) on a mixture of equimolar amounts of n-octane and n-tetradecane essentially as shown in Example 1. The results are shown below:

| Hydrocarbon(s): | Optical density |
|---|---|
| Octane | 0.88 |
| Tetradecane | 2.56 |
| Octane and tetradecane | 9.93 |

Example 7

This example illustrates the fact that the invention is also applicable to growth on an agar (solidified) surface. Three petri dishes containing mineral media solidified by the addition of agar to a final concentration of 0.2% were streaked with 0.1 ml. of a culture of Achromobacter. The plates were incubated in air saturated with vapors of (1) n-heptane, (2) n-tetradecane, and (3) a mixture of seven parts of tetradecane and one part of heptane. The cultures were incubated at 30° C. for 72 hours, and the total amount of growth was determined by scraping the organisms from the agar surface and suspending them in equal amounts of distilled water. The absorbancies of these suspensions were used as a measure of total growth. Following are the results:

| Hydrocarbon(s): | Optical density |
|---|---|
| n-Heptane | 0.52 |
| n-Tetradecane | 0.38 |
| n-Heptane and n-tetradecane | 2.60 |

The marked effect of the various hydrocarbon mixtures on cell growth is evident from the results of the above examples. From Example 1, for instance, it can be seen that an approximate 30-fold increase (over growth on octane alone) was obtained when 0.00347 mole of tetradecane was included with the octane. This is very much more than an addition of the growth on either hydrocarbon alone.

Experimental results with radioactive materials showed that the majority of cell growth takes place on the more volatile hydrocarbon, i.e., on the hydrocarbon containing up to 8 carbon atoms, and that it is thus the primary source of carbon in the hydrocarbon mixtures of this invention. Using mixtures of n-octane and n-tetradecane, one with carbon 14-labeled octane and the other with carbon 14-labeled tetradecane, and employing the procedure of Example 1, the following results were obtained.

| Carbon source: | DPM' in cells |
|---|---|
| Carbon 14-labeled octane+tetradecane | $3.4 \times 10^4$ |
| Carbon 14-labeled tetradecane+octane | $2.9 \times 10^3$ |

From the results, it is evident that roughly 90% of the growth of the Achromobacter took place on n-octane, with the remainder attributable to the less volatile n-tetradecane.

I claim:

1. A method for increasing the growth of a microorganism on a volatile aliphatic hydrocarbon as the primary source of carbon, which comprises introducing said volatile aliphatic hdyrocarbon containing from about 3 to 8 carbon atoms and another hydrocarbon from the group of monomeric hydrocarbons containing in excess of 8 carbon atoms and a polymeric hydrocarbon into a culture comprising a nutrient and said microorganism, said monomeric hydrocarbon or polymeric hydrocarbon being present in an amount sufficient to reduce the vapor pressure of said volatile aliphatic hydrocarbon to a value which allows increased utilization thereof by said microorganism.

2. The method of claim 1 wherein the volatile aliphatic hydrocarbon is an alkane containing from about 3 to 8 carbon atoms.

3. The method of claim 1 wherein the monomeric hydrocarbon contains from 9 to about 30 carbon atoms.

4. The method of claim 3 wherein the monomeric hydrocarbon is tetradecane.

5. The method of claim 1 wherein the polymeric hydrocarbon is a polybutene.

6. The method of claim 1 wherein the polymeric hydrocarbon is a polydecene.

7. The method of claim 1 wherein one of the said monomeric hydrocarbon and the said polymeric hydrocarbon is present in the range of from about 0.1% of the said volatile aliphatic hydrocarbon to an amount in excess thereof.

8. The method of claim 1 wherein the microorganism is an Achromobacter.

9. The method of claim 1 wherein the microorganism is a Nocardia.

10. The method of claim 1 wherein the microorganism is a Bacillus.

References Cited

UNITED STATES PATENTS 3,308,035    3/1967    Douros _____ 195—28
3,326,770    6/1967    Cotyi _____ 195—28 X LIONEL M. SHAPIRO, Primary Examiner J. L. WINDE, Assistant Examiner U.S. Cl. X.R.

99—9, 18; 195—3, 96, 114